Jan. 13, 1970     C. SELOWITZ     3,489,422
TOOL ADJUSTMENT ASSEMBLAGE FOR DRIVE SHAFTS
Filed May 29, 1967
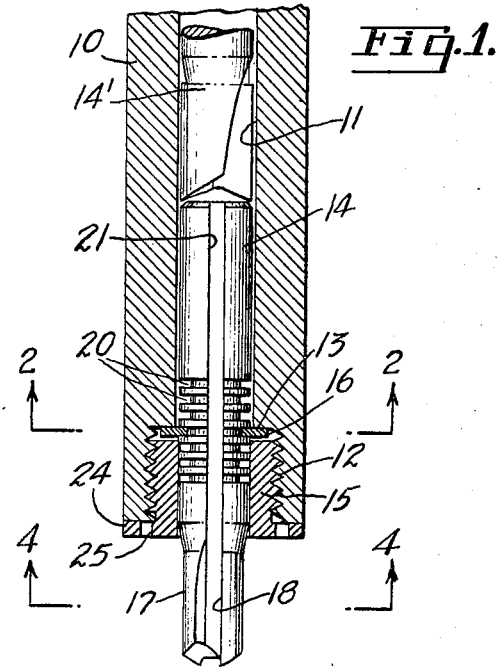
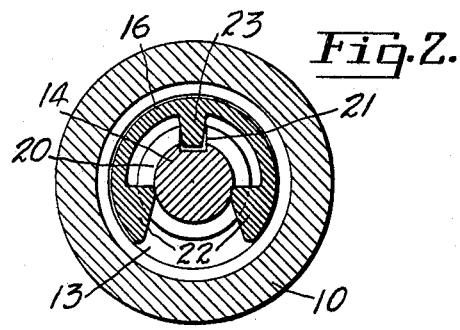
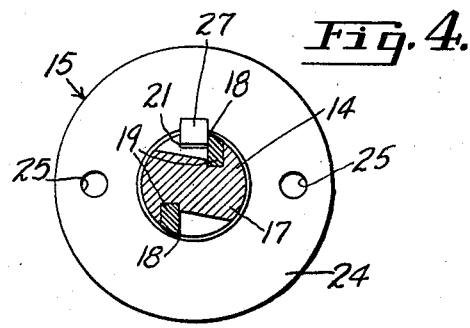
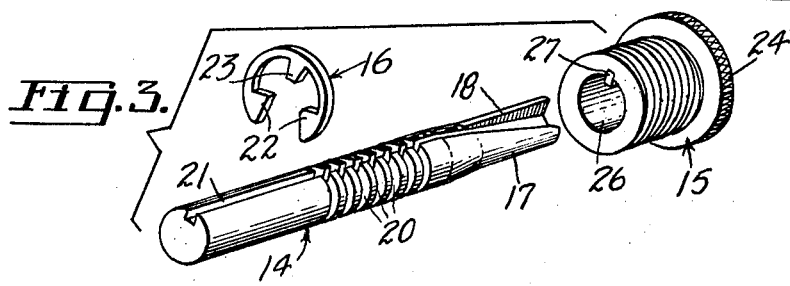
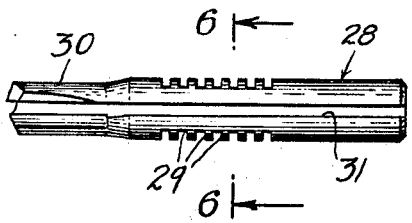
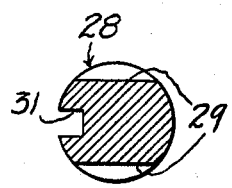
INVENTOR.
CHARLES SELOWITZ
BY
Howard C. Thompson
ATTORNEY

United States Patent Office

3,489,422
Patented Jan. 13, 1970

---

3,489,422
TOOL ADJUSTMENT ASSEMBLAGE FOR DRIVE SHAFTS
Charles Selowitz, Rego Park, N.Y., assignor to Ronald Selowitz, Deer Park, N.Y.
Continuation-in-part of application Ser. No. 625,429, Mar. 23, 1967. This application May 29, 1967, Ser. No. 641,999
Int. Cl. B23b *29/08*
U.S. Cl. 279—89  9 Claims

ABSTRACT OF THE DISCLOSURE

A trimming or other tool, including assemblage parts for adjustably coupling the tool with a motor driven tubular shaft in changing the position of the cutter edge or edges of the tool with respect to the shaft end and a workpiece engaged by the tool.

---

This application is a continuation-in-part of my prior application Ser. No. 625,429, filed Mar. 23, 1967.

BACKGROUND OF THE INVENTION

The invention deals with tools or what are sometimes referred to as bits which can be used for many purposes. In some instances, the entire tool will be made out of steel; whereas, in other instances and, where required, the cutter end of the tool will include carbide tips in operating upon workpieces of various types and kinds. In all instances, the tool adjustment assemblage will be used for modifying or adjusting the position of the cutter end of the tool with respect to the driven shaft, in connection with which the assemblage is detachably and adjustably mounted.

To applicant's knowledge, a tool adjustment assemblage of the type and kind is new in the art and, at this time, applicant has no knowledge of any patents granted on an assemblage of this type and kind.

SUMMARY OF THE INVENTION

The invention may be summarized in stating that three components are employed in defining the assemblage, namely the tool, the lock element engaging longitudinally spaced grooves in the tool shank and the coupling member, to which the tool is keyed and used for detachably coupling the assemblage with a motor driven shaft or an adaptor to such a shaft.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view through the lower end portion of a motor driven shaft or shaft adaptor showing one of the assemblages mounted therein, parts of the construction being shown in elevation.

FIG. 2 is an enlarged section on the line 2—2 of FIG. 1.

FIG. 3 is a bracketed exploded view of the three parts of the assemblage shown in perspective.

FIG. 4 is an enlarged sectional view on the line 4—4 of FIG. 1.

FIG. 5 is a plan view of a modified form of tool; and

FIG. 6 is an enlarged section on the line 6—6 of FIG. 5.

Considering FIG. 1, 10 is the end portion of a motor driven shaft or shaft adaptor or extension having a bit or tool receiving and storing bore 11. The end of the bore is enlarged and threaded, as at 12. The enlargement of the bore forms a stop shoulder 13. A tool 14 is adjustably supported in the shaft through the medium of a stud or collar 15 and a split lock ring or washer 16, which can be termed a lock element. The parts 14, 15 and 16 may be said to comprise a tool adjustment assemblage for mounting in a driven shaft or similar support.

The tool 14 has a cutter end 17 which, in the construction shown, has two cutter edges 18. In an all steel tool, the edges 18 will be integral. However, in FIG. 4 of the drawing, carbide tips 19 are shown. Carbide tip tools are desirable in some uses.

The central portion of the shank of the tool 14 has a series of circumferential grooves 20. Arranged longitudinally of the tool is a key slot 21, which opens into the cutter end 17 in alinement with one of the edges 18, as clearly seen in FIGS. 1 and 4.

The lock washer or element 16 has enlarged ends 22 which operate in the grooves 20 of the tool 14, as seen in FIGS. 1 and 2 of the drawing, and also upon the shoulder 13 in fixing the position of the tool in the shaft 10. The washer 16 can also have a projecting lug 23 to engage the slot 21, note FIG. 2. This lug, however, can be eliminated in some uses.

The collar 15 is threaded to fit the threaded bore 12 and has a milled disc end 24, including apertures 25 for a spanner wrench. The collar 15 may be said to be a coupling member for mounting the assemblage in the driven shaft. The bore 26 of the collar has a key part 27 mounted therein to engage the key slot 21. Note FIG. 4.

Where practical, the bore 11 in the shaft 10 can be sufficiently long to store extra tools for immediate use in replacing a worn or dull tool. In FIG. 1, a part of one of such extra tools is shown at 14'.

In FIGS. 5 and 6 is shown a modified tool 28 which differs from the tool 14 in having alined grooves 29 on opposed sides thereof. These grooves will receive the ends 22 of the washer or element 16, as will be apparent from a consideration of FIG. 2, keeping in mind the showing in FIG. 6. The tool 28 has a cutter end 30, similar to the end 17 of FIGS. 1 to 4, as well as a key slot 31, similar to the slot 21, the slot 31 being at right angles to the grooves 29.

With both forms of construction shown, the assemblage comprising the tool, the collar and the washer are attachable and detachable with respect to the driven shaft by a spanner wrench and by the hand engaging the disc end 24. In changing the position of the cutter end of the tool, the assemblage is detached from the shaft and the position of the washer or element 16 in the grooves 20 and 29 changed.

In some uses of the assemblage, the keying of the collar or coupling member in the key slot of the tool can be dispensed with where the lock element includes the key lug 23. The firm pressure engagement of the coupling member upon the lock element will retain the tool in the shaft or other support. Also, it will be apparent that, in some uses of assemblages of this type and kind, particularly where adjustments for tool positioning are provided, single groove means can be provided in the shank of the tool for one position mounting of the tool in its support. However, in the more general adaptations of the assemblage, the plurality of key grooves provided in the shank simplifies adjustment of the tool, as this adjustment can be quickly and easily accomplished.

Tool assemblages of the type defined will have many uses employing all steel tools, as well as carbide tip tools. One of such uses would be in trimming devices as described, for example, in my application heretofore identified.

Having fully described my invention, what I claim as new and desire to secure by Letters Patent is:

1. A tool adjustment assemblage of the character defined, comprising a tool, a lock element and a coupling member, the tool having a cutter end, the shank of the tool being grooved to be engaged by said lock element, the tool having a longitudinal key slot, said coupling member having a key part adapted to engage said slot in retaining the tool against rotation in said member, and said coupling member having means for detachably coupling the assemblage with a support.

2. An assemblage as defined in claim 1, wherein said lock element comprises a split washer having enlarged means operating in the groove of said tool, and said element being adapted to engage a shoulder in a support in positioning the assemblage in the support.

3. An assemblage as defined in claim 2, wherein said lock element includes a lug engaging the key slot of the tool.

4. An assemblage as defined in claim 1, wherein the grooved part of the shank comprises longitudinally spaced circumferential grooves.

5. An assemblage as defined in claim 1, wherein the grooved part of the tool shank comprises longitudinally spaced and alined grooves on opposed sides of the shank and at right angles to the key slot in the shank.

6. An assemblage as defined in claim 1, wherein the coupling member comprises an externally threaded collar, in which the key part is mounted, and said collar having an enlarged end facilitating coupling and uncoupling of the collar with a support.

7. A tool adjustment assemblage of the character defined, comprising a tool, a lock element and a coupling member, the tool having a cutter end, the shank of the tool being grooved to be engaged by said lock element, the tool having a longitudinal key slot, said lock element including a lug engaging the key slot of the tool, said lock element being adapted to engage a shoulder in a support in fixing the assemblage in the support, and said coupling member having means for detachably coupling the assemblage with a support.

8. An assemblage as defined in claim 7, wherein the grooving of the tool shank includes longitudinally spaced grooves for adjustment of the tool in the support.

9. An assemblage as defined in claim 1, wherein said tool is an expendable component adapted to be replaced by tools of similar shank structure as an original cutter end becomes dulled through use and as cutter ends of different configuration may be desired, and such replacement tools constitute independent articles of commerce.

References Cited

UNITED STATES PATENTS

| | | |
|---|---|---|
| 933,248 | 9/1909 | Grant. |
| 2,529,396 | 11/1950 | Hunt. |
| 2,610,598 | 9/1952 | Midas _____ 279—83 X |
| 2,888,050 | 5/1959 | Einhiple _____ 279—79 X |

ROBERT C. RIORDON, Primary Examiner

DONALD D. EVENSON, Assistant Examiner

U.S. Cl. X.R.

77—71